Oct. 30, 1962 M. V. BERG 3,060,563
METHOD FOR WELDING WORK PIECES OF CAST IRON
Filed July 2, 1958 4 Sheets-Sheet 1
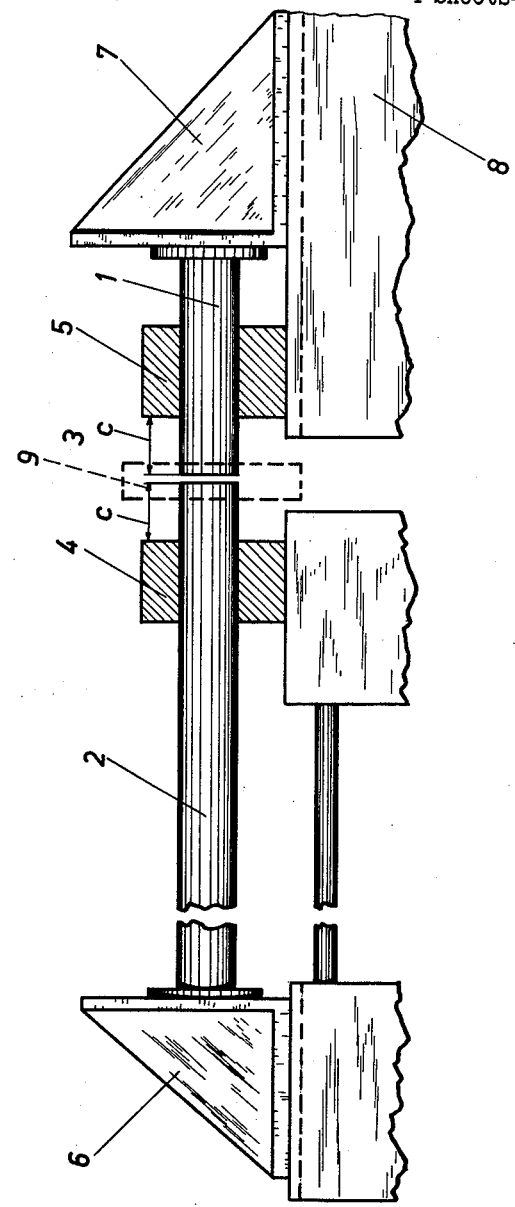
INVENTOR.
Manfred Voldemar Berg Oct. 30, 1962 M. V. BERG 3,060,563
METHOD FOR WELDING WORK PIECES OF CAST IRON
Filed July 2, 1958 4 Sheets-Sheet 2
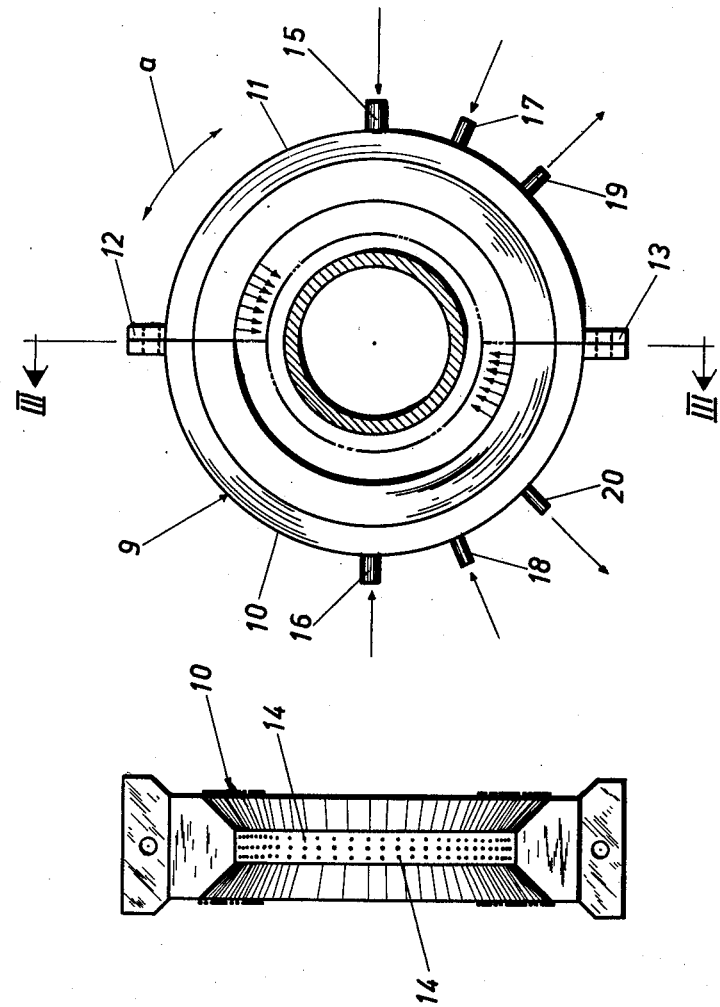
INVENTOR.
Manfred Voldemar Berg
BY

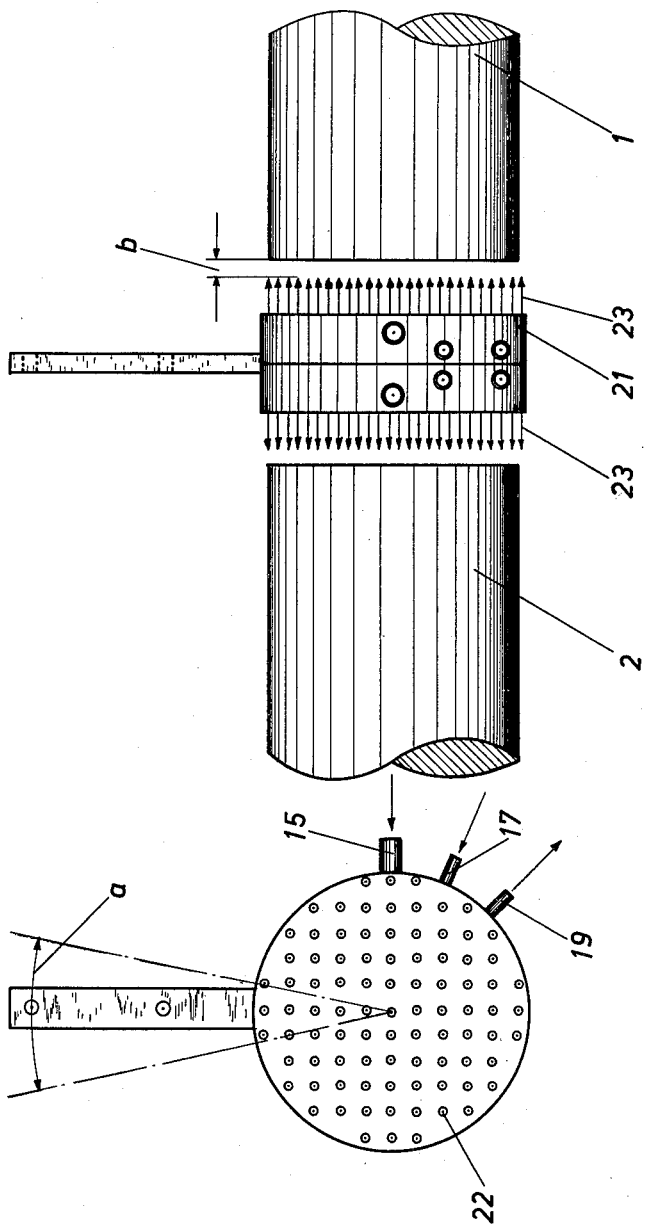

Oct. 30, 1962  M. V. BERG  3,060,563
METHOD FOR WELDING WORK PIECES OF CAST IRON
Filed July 2, 1958  4 Sheets-Sheet 4
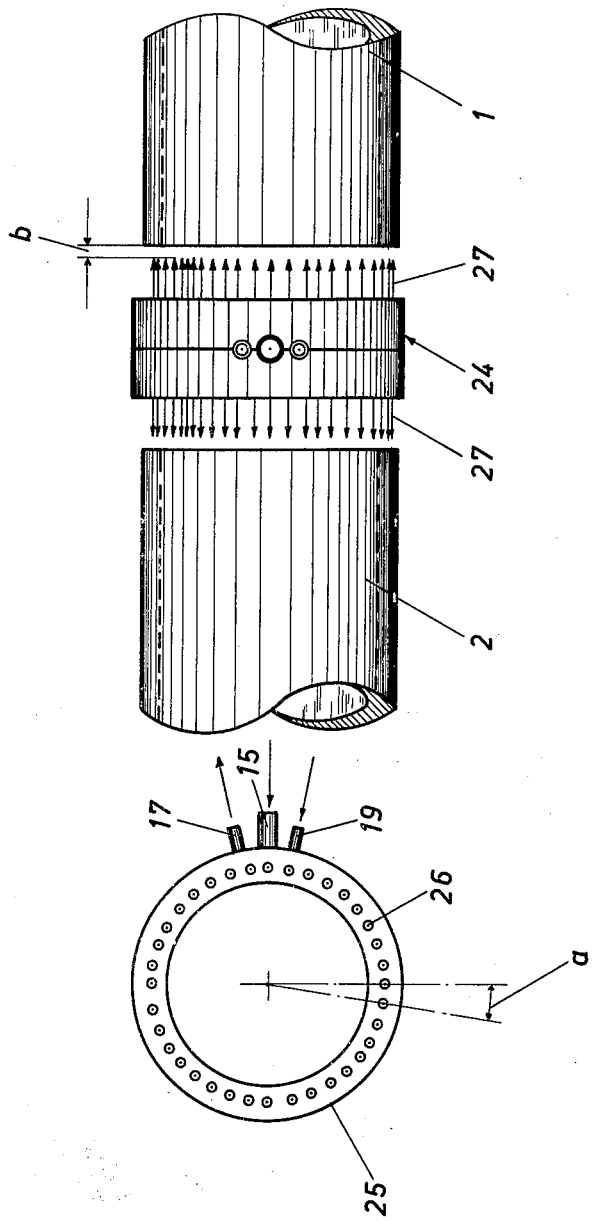
INVENTOR.
Manfred Voldemar Berg
BY 3,060,563
METHOD FOR WELDING WORK PIECES
OF CAST IRON
Manfred V. Berg, Goteborg, Sweden, assignor to Agenturfirma Emvebé M. Berg, Goteborg, Sweden, a corporation of Sweden
Filed July 2, 1958, Ser. No. 746,258
Claims priority, application Sweden July 8, 1957
9 Claims. (Cl. 29—487)

The so-called "string casting" has been developed to enable the rapid manufacture of tubes or pipes of cast iron. However, the provision of flanges and muffs at the ends of the pipe sections for connecting same has presented problems.

Reliably and durably welded joints between work pieces of cast iron could be obtained by means of electrical resistance flash welding, the composition of the cast iron being within a certain analysis. Resistance flash welding is, no doubt, the best method of obtaining centrifugal or string cast tubes having double flanges or double muffs, for instance in comparison with methods where the flanges or muffs are shrunk or threaded on the centrifugal or string cast tube blanks.

Systematic experiments have proved that very good welds could be obtained with less investment in equipment with lower costs by using gas heating whereby the metallurgic conditions are changed. The present invention relates to a method for welding cast iron pieces, especially tube-shaped work pieces, by means of gas butt welding.

A method of this kind has previously been used for joining details of steel, especially steel tubes, as well as details of other metals. However, those skilled in the art have considered cast iron to be a material which could not be used when the joint is to be obtained by means of gas butt welding as until now it has been impossible to obtain welded joints technically acceptable. Such a method has been described in "Werkstoff und Schweissung," by Prof. Friedrich Erdmann-Jesnitzer, volume II, Berlin 1954, page 1118, where it is said that "As cast iron hardly could be brought to a pasty condition, but will go directly from liquid to solid phase or in the reversed direction, the pressure-welding method could not be used nor the fuse-welding method." Also in "Das elektrische Widerstandsschweissen," by Dipl.-Ing. W. Brunst, Berlin 1952, it is stated in the table on page 2 that cast iron cannot practically be used for gas butt welding.

By the present invention it is possible to satisfactorily butt weld centrifugally cast iron pipes or tubes or other work pieces, without additional materials, in a gas flame provided the cast iron as such is of a composition having a saturated valve or factor $S_c$ according to the formula $$S_c = \frac{\text{Percent C}}{4.23 - .312\ \text{Si} - .33\ \text{P} + .066\ \text{Mn}}$$

in the range between .7 and 1.1, a silicon content between 2.0 and 3.5%, preferably between 2.2 and 3.0%, a phosphorous content between 0 and 1.2%, a manganese content between .3 and 1.0% and a total content of phosphorus and carbon between 3.0 and 4.7%.

Experiments have also shown that a so called spheralitic cast iron having nodular graphite could be gas butt welded by means of the method according to present invention.

The unalloyed cast iron, containing besides iron such elements as C, Si, Mn, P, and S, may with regard to the contents of these components be divided into three main groups, viz. sub-eutectic cast iron, eutectic cast iron, and super-eutectic cast iron. In the binary system Fe—C, the cast iron is eutectic at the content of carbon=4.3%. The other components, i.e. Si, Mn, and P and eventually other added components, influence the ability of the cast iron to absorb carbon in the solution for which reason the eutectic point is moved in relation to the contents of said alloying elements. Tobias and Brinkman have drawn up the following formula for the saturated factor $S_c$ with regard to the components C, Si, P, and Mn and their percentile contents in the cast iron:

$$S_c = \frac{\text{Percent C}}{4.23 - .312\ \text{Si} - .33\ \text{P} + .066\ \text{Mn}}$$

When according to this formula $S_c < 1$, the cast iron is sub-eutectic
$S_c = 1$, the cast iron is eutectic
$S_c > 1$, the cast iron is super-eutectic.

The percentile values of C, Si, P of a given cast iron analysis are to be inserted in the above formula.

Test weldings have shown that the manufactured cast iron, which without difficulties may be gas butt welded, should preferably be in the sub-eutectic range with regard to its chemical composition.

The technically acceptable explanation of the obtained results is that the lower the saturated factor $S_c$ the more there will be present primary mixed $\gamma$-crystals (austenite) in the structure, said crystals being free of graphite, tenacious and rich in iron and they give better resistance values at high temperatures than crystals in the eutectic zone.

As generally the resistance in the temperature range in which the welding takes place, i.e. at approximately 1830° F. to 2010° F. is very low, no considerable butt force could be used at the pressing together of the work pieces. However, the welding is performed with a certain speed so as to press out of the joint the fused metal formed or the main part of such which to a great part contains cinders and oxides. The joint is thus formed in the semi-solid phase close to the molten metal.

A theoretical explication of the jointing phenomenon could be that the atoms situated in the semi-solid phase close to the molten metal are unstable, i.e. their prior position relative to the neighboring atoms has partly changed at the high temperature close below the border between fused and semi-solid cast iron. Upon an application of moderate pressure to the work pieces the atoms in the semi-solid phases will adjust themselves for diffusion between such phases and then, upon cooling of the work piece, the interbinding of the atoms is similar to that during ordinary solidification.

As the semi-solid phase of the cast iron has a depth from the fusion formed in the outer region, it is necessary to upset, or butt, the cast iron work pieces with an accurately defined butt length to prevent a deformation of the phase state which is favourable for forming the joint. A bad deformation would take place at long butting lengths, said phase extending only about $\frac{1}{16}''$ to $\frac{7}{32}''$ beyond the fused metal formed, especially in tubes of cast iron.

It has turned out that the cohesion force at welding work pieces of cast iron will increase the more the structure comprises austenite in relation to cementite. The more the cast iron is sub-eutectic the more the strength will increase in the welded joint. This depends only on the condition that the mixed $\gamma$-crystals are tenacious and have a higher diffusion coefficient than the cementite crystals.

It is of main importance in which form the graphite is in the cast iron as well as the contents of phosphorus and eventual oxides.

Good gas butt welding of cast iron work pieces is enabled by generally meeting the conditions imposed next below.

The metallic basic mass of the sub-eutectic cast iron must as far as possible be undivided, i.e. the separation of graphite should not be of such an extent that great cavities are formed in the basic mass, such cavities decreasing the cross section. In other words, the graphite should be finely divided, be in the form of temper carbon or be formed in a spheroidal way.

Further, the contents of phosphorus increases the discontinuity of the metallic basic mass by its brittle and hard qualities caused by the so called phosphide eutectic $Fe_3P$.

The cohesive force between the atoms in the work pieces will thus increase with lower phosphorus contents and with the fineness of the graphite particles.

It is obvious from the aforesaid that the saturated factor $S_c$ of weldable cast iron should have a value between .7 and .98, preferably between .7 and .95. The contents of carbon in the pieces of cast iron should be between 2.2 and 3.7%, preferably between 2.4 and 3.5%, while the contents of silicon and phosphorus should be chosen in such a way that the saturated factor $S_c$ according to Tobias and Brinkman does not exceed .98 and the total amount of carbon and phosphorus should be chosen between 3.0 and 4.7%. The contents of silicon should be between 2.0 and 3.5%, preferably between 2.2 and 3.0%, the contents of phosphorus between 0 and 1.2% and the contents of manganese between .3 and 1.0%.

When the values of strength in the welded joint should be up to 100% of the strength in the basic material, the contents of phosphorus in the pieces of cast iron, which should be as low as possible, should be chosen between 0 and .8%.

The string of centrifugal cast material to be gas butt welded, i.e. chilled goods in general, should have a total amount of carbon and phosphorus between 3.0 and 4.7%, but the best results are obtained with values between 3.0 and 3.4%.

The contents of sulphur, which should also be as low as possible, should be between 0 and .7%, preferably between 0 and .5%. Experiments have shown that welded joints could be obtained having almost the same strength as the basic material if the contents of carbon is chosen 3.1%, of silicon 2.8%, of phosphorus .2%, of manganese .5%, and of sulphur .05%.

At eutectic or almost eutectic composition of the material to be welded, the contents of sulphur should have a higher value, viz. between .07% and .12%.

It is of great importance in gas butt weldings that the contents of silicon be high because by heating with burning gas the fused material in such a case will be exposed to oxidation and chemical influences more than in electric resistance welding. Especially when the flames are arranged in the vicinity of the welding zone, there will occur a burning away of silicon and to some extent a reduction of carbon. The graphite, divided in the pieces of cast iron, has to be finely dispersed and be in the form of tempered or nodular carbon.

The operation of gas but welding will be described with reference had to the accompanying drawings. In the drawings:

FIG. 1 shows a device for gas butt welding with clamped work pieces,

FIG. 2 shows a gas burner which surrounds a tube to be welded,

FIG. 3 is a section through the burner on the line III—III in FIG. 2,

FIG. 4 shows another embodiment of the burner, adapted for welding solid rods of cast iron, FIG. 5 shows an end elevation of the burner according to FIG. 4, FIG. 6 shows a burner which should preferably be used when thicker tubes are to be welded and FIG. 7 shows an end elevation of the burner according to FIG. 6.

The work pieces 1, 2 of cast iron are clamped in the machine and are brought to butt contact with each other with an accurate fitting of the welding surfaces which should be finished by machine, be free of oxides and in the case of tubes have an even thickness. If the work pieces are placed close to each other, they have to be exposed to a butt pressure before being heated. The butt pressure may be approximately 25 pounds per sq. in. welding surface but this pressure is of minor importance as the length of the butt movement should be limited to a definite number of inches.

Test weldings made have proved that good results could be obtained when the work pieces are placed in the machine in such a way that there is left a space 3 of $\frac{1}{32}$"–$\frac{1}{16}$" between them there is obtained a more effective heating of the welding surfaces and there is also provided an entrance for the welding gas to the interior of the tubes, said gas preventing the oxygen of the air from the vicinity of the weld. In such a method (cf. FIG. 1), no accurate finishing of the weld surfaces is necessary.

In order to maintain a good heat equilibrium on both sides of the welded joint, it is advisable to arrange on the tube bodies cooling jaws, 4, 5 the distance c of which to the joint will vary with the size of the welding surfaces. Said cooling jaws 4, 5 could simultaneously serve as guiding devices. The jaws could be manufactured of steel, or better of copper, and be cooled by means of water.

The pieces 1 and 2 are clamped in the machine in such a way that they cannot be moved in an axial direction during the butting operation. To this end, supports 6, 7 are arranged at the outer ends of the work pieces. The work piece 1 can at the time of the butting operation be moved in the direction towards the other work piece 2, and the length of this movement is controlled on a scale of the machine. For this purpose, the work piece 1 is arranged in cooling jaws on a carriage 8 which is moved in guiding devices and is preferably moved automatically or mechanically. For the adjustment of the length of the butting operation there are arranged special coupling devices (not shown), for stopping the movement of said carriage 8 with an exactness of $\pm\frac{1}{100}$". Such devices are previously known and will therefore not be described.

The work piece 2 is arranged between the cooling jaw 4 and the support 6 on the other part of the machine, said part having a frame shaped as a movable stand which is adjustable in lateral as well as in vertical directions about 1½" for fitting the weld surfaces relative to each other. When said surfaces are aligned relative to each other, the support devices are locked. The upper part of said cooled jaws are mounted or demounted for each welding operation and are clamped to the tubes by means of special devices. The gas burner 9 is in FIG. 1 indicated only diagrammatically by means of broken lines.

A gas burner, known per se and suitable for the method according to the present invention is shown in FIGS. 2 and 3. Said burner comprises two ring halves which may be locked to each other by means of locking devices 12 and 13. When the ring halves 10 and 11 are locked to each other, they form a ring shaped burner which surrounds the work piece 1 or 2 to be treated. The burner 9 has at its inner side surface openings or jets 14 for gas which are shaped in such a way that the flames (indicated by the arrows 15 in FIG. 2) are directed radially towards the work piece. The burner halves are symmetrically shaped and have each an intake 15, 16 for gas, each an intake 17, 18 and an outlet 19, 20 for cooling water as well as devices for attaching the burner to the machine. Burners of the same or other types could be manufactured for different, normal dimensions of tubes and be dimensioned in respect to the required amount of gas in such a way that with large diameters and great thickness of the tubes it would be possible to obtain an economical and rapid production.

In FIGS. 4 and 5, there is shown a burner 21 to be used in connection with solid bar material, said burner being shaped as a disk having evenly distributed over its circular surfaces gas outlets 22 through which burning gas (indicated in FIG. 4 by means of the arrows 23) will stream towards the surfaces to be welded. Corresponding details have in FIGS. 2, 3 and FIGS. 4, 5 been given the same reference letters, i.e. the work pieces have been designated with 1 and 2, the gas intake with 15, the intake for cooling water with 17 and the outlet for the latter with 19. The distance between the welding surfaces and the core flames should in this case be between $3/16''-5/16''$ when the burner has been inserted between said surfaces. When said surfaces have been heated to the necessary temperature, the burner is removed and the work pieces 1 and 2 are moved towards each other. In other to obtain more even heating of the surfaces the burner is mounted by means of a sepcial device comprising a little gear wheel engine, eccentric disks and spring means, which elements cause the burner to oscillate round its own axis over about 20°, as indicated by the arrows $a$ in FIGS. 2 and 4, in a vertical plane relative to the longitudinal axis of the work pieces. Said oscillating movement is preferably started at the lighting of the burner and is obtained by means of said gear wheel engine.

It is also possible to use a burner of another type in which a slot extends over the inner periphery of the burner, said slot having a width of about $1/100''$ to $1/180''$. In connection with such a burner no oscillations will be necessary.

In FIGS. 6 and 7, there is shown a burner 24, which is adapted especially for welding tubes having thick walls. The burner 24 comprises a rather thick ring 25 with outlets 26 for gas arranged in a circle and in such a way that the flames will be directed as indicated by the arrows 27, i.e. radiating towards and heating the end surfaces of the work pieces 1 and 2. Also this gas burner is provided with an inlet 17 for water, an inlet 15 for gas as well as with an outlet 19 for water. In gas butt welding with the burner according to FIGS. 6 and 7, one could work in the same way as with the burner according to FIGS. 4 and 5.

For the heating, the burner is arranged in its position in such a way that the flames are directed concentrically in relation to the central line of the tube when using the burner shown in FIGS. 2 and 3. The distance $b$ from the points of the core flames to the outer surface of the tube should also in this case be between $3/16''$ and $5/16''$. The flames are directed towards the free space between the work pieces 1 and 2 or, if the tubes are brought to butt contact with each other, towards the joint. When working with tubes having thick walls, the flames are arranged in three parallel rows (see FIG. 3). The heating is preferably performed with slightly reducing flames until a fusion has been created over the two surfaces to be welded. The temperature of the material will then be between 2100° F. and 2140° F. If cooling jaws are used, the latter will also serve to eliminate the risk of the outer surfaces being fused before the inner surfaces of the tube section. The cooling jaws arranged on the outer surface of the tubes and at a certain distance from the welded joint will equalize differences in temperature between the outer and the inner surface of the tube walls at the weld area in such a way that fusion will take place simultaneously over the whole weld surface of the two work pieces. They also prevent an uneven transmission of heat from the weld joint, and thus they secure a good heat balance on both sides of the welded joint.

It may as an example be mentioned that when using centrifugal cast tubes having an inner diameter of 8'' and a wall thickness of about $3/8''$, the distance between the cooling jaw and the welding joint has been $3 3/8''$ which resulted in an even fusion over the whole welding surface.

At the burners shown in FIGS. 4, 5 and 6, 7 the same distance could be used between the end of the work pieces and the cooling jaws.

As an example of suitable gas mixtures there could be mentioned the most effective one comprising oxygen and acetylene which for obtaining a slightly reducing flame should be mixed in following amounts: oxygen between 52 and 58% and acetylene between 48 and 42%, preferably 52 to 54% oxygen and 48 to 46% acetylene.

The gas mixture could also comprise oxygen and gasolene which is obtained as a by-product for instance at the manufacture of shale oil and exists in the form of propane and butane gas. The chemical formulas of propane is $C_3H_8$ and of butane $C_4H_{10}$ and the effective heat value of propane is 2512 B.t.u./cu.ft. and of butane 3317 B.t.u./cu.ft. The mixture of propane and butane has approximately 15% lower heat effect in a mixture with oxygen but it forms a more effective protection zone around the welding place than the mixture of acetylene and oxygen due to its higher reducing effect and it prevents the fused metal from being oxidized by the oxygen in the air.

A plurailty of tests with different mixtures of gas have proved that the rate of the welding is higher when using a gas mixture comprising acetylene and oxygen than with other gas mixtures but the welding qualities will be better when using a gas mixture comprising oxygen and gasoline.

When welding larger tubes whereby the welding time is extended due to greater thickness of the welds there arises a greater risk for oxidation than when tubes with smaller dimensions are welded. In such welding operations the welding surfaces have to be treated with suitable fluxing material (a fusing agent), for instance sodium borax, $Na_2B_4O_7$, said fluxing material to some extent preventing the oxide coating from growing to such an extent that it could influence the welding results. It is to be pointed out that the fluxing material may not be mixed up with additions as such additions are not used in any case at gas butt welding of cast iron in accordance with the present invention.

It is also possible to restrain the oxidation and the forming of hard and brittle welding joints in the following manner. As stated here above, there will be a certain reaction between silicon and the iron oxide in the fusion by the forming of the latter and thereby there occurs a material decrease of the silicon contents in the fusion which will decrease the separation of graphite, and the welded joint will then be harder than the basic material surrounding it. As the gas flames could be adjusted to contain an excess of oxygen relative to acetylene, no carbon will in this way be added to the cast iron, while on the contrary when there will be an excess of acetylene in the flames, the carbon should contribute in the reduction of the oxide and prevent too great a loss of silicon. It is thus advisable to treat the welding joint in the last phase of the heating operation and before, as well as during the forming of the fusion, with graphite dust having a particle size of up to $1/80''$ or with some gas rich in carbon, preferably acetylene. The heating could thus in the last related case be performed with a slightly reducing flame until the last phase of the heating period whereupon the flames are rapidly adjusted into sooting.

A device for the treatment by graphite could be arranged in the oscillating burner and be provided with special jets through which during some seconds graphite powder is blown by means of an inert gas under pressure. Welded joints obtained in this way have turned out to have small contents of oxides and also to be softer which is of importance during the further working than welding joints obtained without addition of carbon.

As soon as the surfaces of the pieces to be joined have fused, the butting movement takes place which may be effected automatically by means of relays and a butt mechanism in a way known per se. During the butting operation, the carriage 8 (see FIG. 1) is moved with one of the work pieces and the pressing together is performed over a length of $1/8''-5/16''$, preferably $1/4''-1/8''$, after the welding surfaces have been brought in contact with each other. In connection with tubes having thin walls the butting length has to be between 5/64" and 10/64", preferably between 3/32" and 5/32" after by means of the moving forwards of the carriage the surfaces have been brought to contact with each other. Tubes having thin walls always involve a great risk of overlapping and thus the butting operation should be given special attention. At the butting, the fused metal formed during the heating is pressed out of the welded joint, said fused metal containing cinders, oxides and other impurities. The joint itself is obtained, as stated in the aforesaid, in the semi-solid phase of the welded joint.

As the butting is performed rapidly and with an accurately defined length and as the strength in the semi-solid phase is a minimum, there could not occur any notable specific butt pressure. The length of the butting movement set forth here above has been fixed by means of a plurality of tests and has turned out to be situated within the range for the allowed butt pressure of the cast irons set forth here above, said irons having the temperature limits mentioned here above. As soon as the carriage has started to move, the burner is extinguished and the oscillating movement is stopped, or in the embodiments of the burner shown in FIGS. 4, 5 and 6, 7 the burner is removed from the space between the work pieces 1 and 2.

The temperature in the welding zone is rapidly lowered to about 930° F., preferably within 2 minutes, whereby besides a higher productivity there is obtained a fine crystallinic, ferritic graphite structure in such a way that the strength in the joint will be the same as in the material surrounding it. The cooling is performed by means of cooling jaws which are cooled by means of water flowing through them or by means of cooling air. When the temperature has been lowered to 930° F., the work piece is taken out of the machine and is left for cooling to room temperature. The whole operation from the clamping of the work pieces in the machine to the placing of the welded tube on a conveyor may for different dimensions of the tube be carried out within following time periods:

| Tube No. | Inner diameter, inches | Wall thickness, inches | Treatment period, min. |
| --- | --- | --- | --- |
| 1 | 10 | 30/64 | approximately 8. |
| 2 | 13¾ | 33/64 | approximately 10. |
| 3 | 15¾ | 37/64 | approximately 12. |
| 4 | 17¾ | 38/64 | approximately 13. |

Tests have shown that the welded joints are compact when exposed to an internal water pressure of about 10 pounds/sq. in.

As determined by tests, the strength in the welded joints has turned out to be 98% of the strength of the basic material without any specail heat treatment. Metallographic tests have shown that the welded joint had no ledeburite encasements and that the structure was ferritic-graphitic in correspondence with the material situated close to it when annealed, when centrifugal cast iron as basic material is used.

As known, most continental and English cast irons contain important quantities of phosphorus, often between .8 and 1.2%. This is due to the fact that the ores contain important quantities of phosphorus and that phosphorus is added to the fusion, especially for the centrifugal casting of tubes in order to obtain lower viscosity in rotating the water cooled moulds.

Tests with gas butt welding have shown that under certain circumstances it is possible to obtain leakproof welded joints, i.e. if the welding operation is performed in accordance with the present invention and when any of the burners shown in FIGS. 2–7 are used. As the gas butt welding of materials having eutectic or almost eutectic composition, i.e. having a saturated factor $S_c$ in the range between .99 and 1.1, are disposed to solidify with the greater part as cementitic structure, the weld joints should be normalized annealed for elimination of hardness in the joint and in its neighboring material, i.e. the material treated or influenced by heat.

For the gas butt welding of centrifugally or otherwise cast tubes containing phosphorus in amounts between .8 and 1.2% and further having a saturated factor $S_c$ between .98 and 1.1 and containing a total amount of carbon and phosphorus up to maximum 4.7% it is advisable to proceed in the following way. At eutectic or almost eutectic cast iron alloys the change from fused to solid phase is sudden and if there is a high amount of phosphorus in the material, for instance exceeding 1%, the fused metal will be very low in viscosity and be disposed to directly flow out of the welded joint. At such amounts of phosphorus, the material should advisably be a little richer in sulphur, however no more than .12% as the sulfur renders the fused material more viscous. The heating of cast iron having such a composition is preferably carried out in two steps in such a way that the ends of the tubes are pre-heated to about 1300° F.–1650° F. by means of the burner shown in FIGS. 4, 5 or 6, 7, respectively, and is thereupon heated by means of a ring burner, e.g. of the kind shown in FIGS. 2 and 3, until the welding surfaces have reached welding temperature. Also in such a method, it is advisable to protect the surfaces against oxidation by treating them for instance with a liquid fluxing agent, e.g. the one known in the market under the name of "Gussolit," or a similar agent.

When using the burner shown in FIGS. 6 and 7, the butting movement shall start as soon as fused drops are formed on the welding surfaces and for this reason the burner 24 is at this moment removed and the work piece 1 is moved towards the work piece 2 with such a speed that the butting can be carried out within the short period during which the fused state of the joining surfaces is maintained after that the burner has been removed. This period is very short as the eutectic or almost eutectic cast iron solidifies very rapidly. Because of this, the removal of the burner and the butting must be carried out within approximately two seconds, and thus these movements in the gas butt machine have to be synchronised and obtained automatically. The butting should of course be carried out with an accurately defined butting length so that, when the welding surfaces have been brought into contact with each other, the work pieces are moved no more than 3/32" towards each other. The specific butting pressure may, however, not exceed 25 pounds per sq. in. welding surface as otherwise the short length of the butting movement could involve risks for causing deformations in the solid material. The specific butting pressure may not in any case exceed the strength of the material at the temperature in question, i.e. at 2100° F.–1830° F.

The strength of cast iron at high temperatures, especially with regard to butting stresses, depends on the chemical analysis of the material and especially the saturated factor $S_c$ and the total amount of carbon and phosphorus are characteristic indications of the strength. The specific butting force, expressed in kg. per mm.² welding area, may thus be expressed as a function of the saturated factor and the total amount of carbon and phosphorus after correction for the depth of the heating up to 1830° F. and the length of the butting on this depth and may be expressed by means of the following formula:

$$P_{sp} = \frac{1}{S_c(C+P)} \cdot K \text{ where } K = \frac{L_1}{L_2}$$

and where $P_{sp}$ = the specific butting pressure in kg. per mm.² welding area $S_c$ = the saturated factor according to Tobias' and Brinkman's formula C = the percentile contents of carbon P = the percentile contents of phosphorus
$L_1$ = the heating depth in the end of the tube with $t° \geq 1830°$ F., and
$L_2$ = butting movement length As the length of the butting may not extend into parts of the stocks having a temperature under 1830° F., the constant K could never be less 1 but is commonly between 1.2 and 1.5.

The welding surfaces should in this case be sprayed with graphite powder just before the material reaches its fusion temperature.

The burner shown in FIGS. 6 and 7 could also be used for welding sub-eutectic cast iron when the wall thickness of the tube does not exceed ¼". With sub-eutectic tube materials it is, however, advisable to use the gas mixture set forth here above and comprising oxygen and acetylene.

In laying long-distance oil transmission lines, it has been customary to use only steel pipe, but by use of the present invention centrifugally cast iron may be used. It has turned out that existing long distance oil pipe lines are inclined to rust and thus it should be of great interest to use cast iron tubes.

Welding works in the field could be carried out by means of gas butt welding machines which principally correspond to the machine shown in FIG. 1 but the butt movement mechanism may be driven with air pressure or other known means if power for the shown electric motor is not convenient.

The burners shown in FIGS. 6 and 7 could be used as burner when oil pipe lines are to be welded and oxygen and gasoline are preferably employed for the gas mixture. In such a case the welded joints have to be annealed after the welding operation and this annealing operation could be made by means of the burner shown in FIGS. 2 and 3 but it should be observed that during all the heating up to a temperature of about 1690° F. and during about 5 minutes at this temperature the burner should oscillate over about 15°–20° in a plane perpendicular to the longitudinal axis of the tube. The burner should also be moved parallel to the longitudinal axis of the tube about 8" over the joint. In accordance to the outer temperature, the welding joint may after annealing be covered with a layer of asbestos until the joint slowly reaches the temperature of its neighboring material.

The method according to the present invention for gas butt welding of cast iron involves advantages as it requires simpler equipment and lower costs for welding especially in connection with large cast iron tubes. Also the welding operation may be performed with specially constructed machines at places where no electric power is available and thus, the described method must be considered as technically superior to prior described methods for the manufacture of centrifugal cast tubes having double flanges or double muffs.

What I claim is:

1. A method for joining cast iron pipe comprising alining such sections wherein the cast iron consists essentially of carbon, silicon, phosphorus, manganese, sulphur, and the balance iron and having a saturation factor $S_c$ defined by the relationship $$S_c = \frac{\text{percent C}}{4.23 - .312\ \text{Si} - .33\ \text{P} + .066\ \text{Mn}}$$

wherein $S_c$ is between .7 and 1.1, silicon between 2.0 and 3.5%, phosphorus no more than 1.2%, manganese between .3 and 1.0% and sulphur no more than .12%, the total amounts of phosphorus and carbon being between 3.0 and 4.7%, carbon in excess of that required to form ferrite being in a form taken from the group consisting of temper carbon and finely divided nodular graphite widely dispersed throughout the ferrite; directing slightly reducing gas flames about the ends of the sections to heat same to approximately 1830° F., to 2010° F. to melt the end portions substantially at their end surfaces and soften the adjacent metal; then quickly moving the sections relatively toward each other axially for a distance of between 5/64 and 5/16 inch after the ends have been brought in contact with each other to force out liquid metal and effect a union of plastic metal underlying the molten metal, and at pressures under 25 lbs. per square inch.

2. A method as claimed in claim 1, the saturation factor being between .99 and 1.1 and annealing the resulting weld.

3. A method for joining cast iron pipe sections comprising alining such sections wherein the cast iron consists essentially of carbon, silicon, phosphorus, manganese, sulphur, and the balance iron and having a saturation factor $S_c$ defined by the relationship $$S_c = \frac{\text{Percent C}}{4.23 - .312\ \text{Si} - .33\ \text{P} + .066\ \text{Mn}}$$

wherein $S_c$ is between .7 and 1.1, silicon between 2.0 and 3.5%, phosphorus no more than 1.2%, manganese between .3 and 1.0%, and sulphur no more than .12%, the total amounts of phosphorus and carbon being between 3.0 and 4.7%, any carbon in excess of that required to form ferrite being in a form taken from the group consisting of temper carbon and finely divided nodular graphite widely dispersed throughout the ferrite; directing slightly reducing gas flames about the ends of the sections to melt the end portions substantially at their end surfaces and soften the adjacent metal; then quickly moving the sections relatively toward each other axially for a distance of between 5/64 and 5/16 inch after the ends have been brought in contact with each other to force out liquid metal and effect a union of plastic metal underlying the molten metal, and at pressures under 25 lbs. per square inch and then controlling the temperature of the resulting weld to avoid permanent strains.

4. A method as claimed in claim 3 wherein the phosphorus content is below .8% to give the weld almost as great a strength as that of the cast iron.

5. A method for joining cast iron pipe sections comprising alining such sections wherein the cast iron consists essentially of carbon, silicon, phosphorus, manganese, sulphurs, and the balance iron and having a saturation factor $S_c$ defined by the relationship $$S_c = \frac{\text{Percent C}}{4.23 - .312\ \text{Si} - .33\ \text{P} + .066\ \text{Mn}}$$

wherein carbon is between 2.4 and 3.5% and $S_c$ is between .7 and .98, silicon between 2.2 and 3.0%, phosphorus no more than 1.2%, manganese between .3 and 1.0%, and sulphur no more than .12%, the total amounts of phosphorus and carbon being between 3.0 and 3.4%; directing slightly reducing gas flames about the ends of the sections to melt the end portions substantially at their end surfaces and soften the adjacent metal; then quickly moving the sections relatively toward each other axially for a distance of between 5/64 and 5/16 inch after the ends have been brought in contact with each other to force out liquid metal and effect a union of plastic material underlying the molten metal, and at pressures under 25 lbs. per square inch.

6. A method for joining cast iron pipe sections comprising alining such sections not exceeding ¼ inch in wall thickness and wherein the cast iron consists essentially of carbon, silicon, phosphorus, manganese, sulphur, and the balance iron and having a saturation factor $S_c$ defined by the relationship $$S_c = \frac{\text{Percent C}}{4.23 - .312\ \text{Si} - .33\ \text{P} + .066\ \text{Mn}}$$

wherein $S_c$ is between .7 and .98, silicon between 2.0 and 3.5%, phosphorus not more than 1.2%, manganese between .3 and 1.0%, and sulphur no more than .12%, the total amount of phosphorus and carbon being between 3.0 and 4.7%; directing slightly reducing gas flames about the ends of the sections to heat same to a temperature of 1830° F. to 2010° F. sufficiently to melt the end portions substantially at their end surfaces and soften the adjacent metal; then quickly moving the sections relatively toward each other axially for a distance of between 5/64 and 5/16 inch after the ends have been brought in contact with each other to force out liquid metal and effect a union of plastic metal underlying the molten metal, and at a pressure under 25 lbs. per square inch, the length of end portions of the tubes reaching 1830° F. being between 1.2 and 1.5 times one half said distance and then cooling the resulting weld to about 930° F. over a period of about two minutes.

7. A method as claimed in claim 6, said pressure being related to the composition of the cast iron and said movement by the relationship $$P_{sp} = \frac{K}{S_c(C+P)}$$

wherein $P_{sp}$ is the specific pressure in kg. per mm.² welding area, $K$ is the ratio of the length of the heating depth of the end portions reaching 1830° F. to one half the relative movement of said pipes, said ratio $K$ being between 1.2 and 1.5 $S_c$, said saturation factor, and C and P the respective percentages of carbon and phosphorus in the cast iron.

8. A method as claimed in claim 7, said gas flames being produced from a mixture of between 52–58% oxygen and 48–42% acetylene.

9. A method as claimed in claim 7 said flames being produced by a mixture of approximately 60% oxygen and 40% gasoline vapor.

References Cited in the file of this patent
UNITED STATES PATENTS

| | | |
|---|---|---|
| 1,708,815 | Willie | Apr. 9, 1929 |
| 1,924,528 | Waltenberg | Aug. 29, 1933 |
| 1,943,123 | Kreutz | Jan. 9, 1934 |
| 2,092,557 | Quarnstrom | Sept. 7, 1937 |
| 2,196,180 | Anderson | Apr. 9, 1940 |
| 2,229,405 | Currier | Jan. 21, 1941 |
| 2,392,824 | Lytle et al. | Jan. 15, 1946 |
| 2,485,760 | Millis et al. | Oct. 25, 1949 |
| 2,485,761 | Millis et al. | Oct. 25, 1949 |
| 2,488,513 | Morrogh | Nov. 15, 1949 |
| 2,834,871 | Berg | May 13, 1958 |